Feb. 7, 1933.  E. LATSHAW  1,896,961
BRAKING APPARATUS FOR CAR TRUCKS
Filed June 10, 1932  2 Sheets-Sheet 1
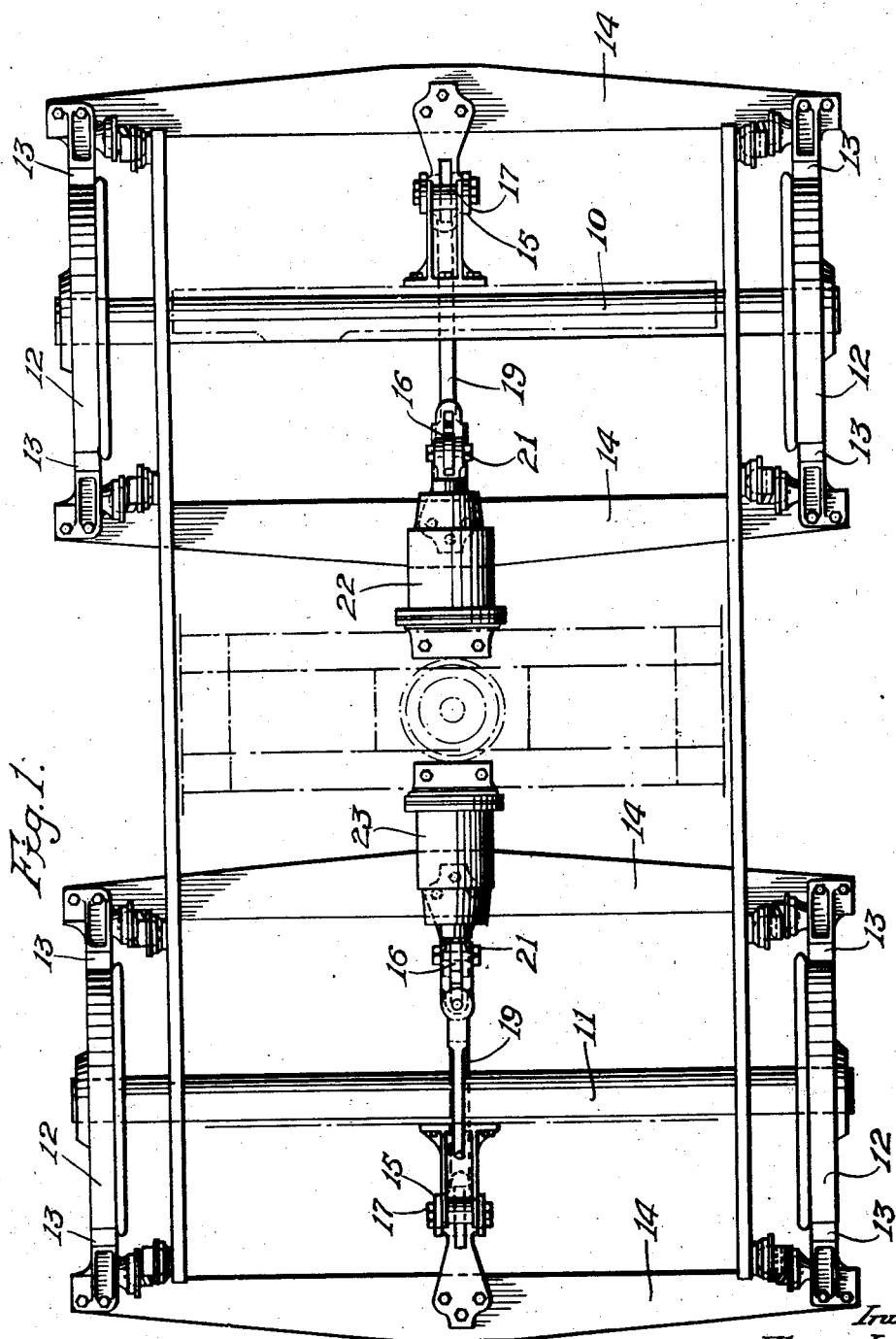

Feb. 7, 1933.   E. LATSHAW   1,896,961
BRAKING APPARATUS FOR CAR TRUCKS
Filed June 10, 1932   2 Sheets-Sheet 2
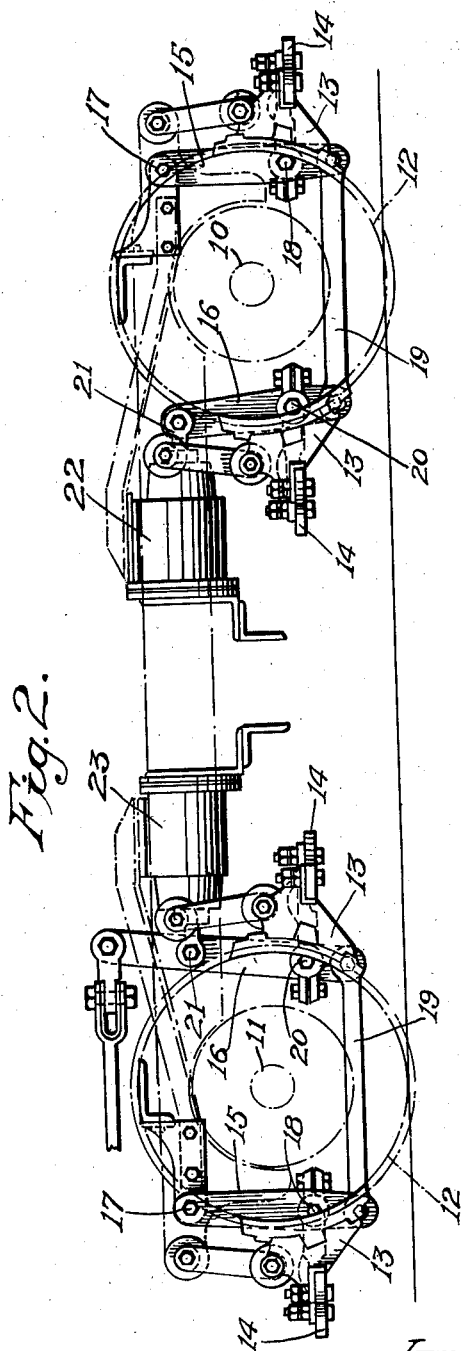
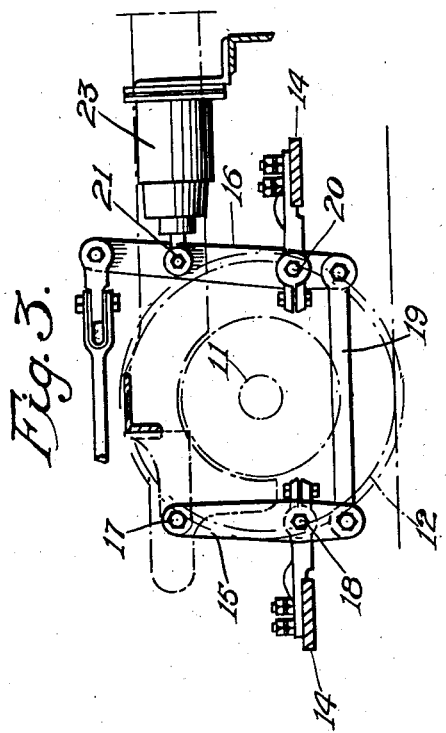
Inventor:-
Elmer Latshaw
by his Attorneys
Howson & Howson Patented Feb. 7, 1933

1,896,961

UNITED STATES PATENT OFFICE

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA

BRAKING APPARATUS FOR CAR TRUCKS

Application filed June 10, 1932. Serial No. 616,554.

This invention relates to braking apparatus for car trucks, and more particularly to a braking apparatus especially adapted for use in the car trucks of single end low level cars.

As is well known to those familiar with the art, it is extremely desirable in single end cars that braking shall be graduated among the wheels with the greatest braking occurring upon the wheels of the axle at the front end of the car and the least braking effect at the axle at the rear end of the car.

While mechanisms have been devised for obtaining such braking action, all of such mechanisms with which I am familiar depend upon a system of leverage greatly complicating the braking apparatus, necessitating the manufacture of a plurality of levers of graduated sizes and, in general, adding to the cost and detracting from the efficiency of the braking apparatus.

An important object of this invention is the provision of a structure wherein the braking levers of each truck are similar at each axle and at the same time the graduated braking effect is obtained.

A further and more specific object of the invention is the provision of a braking system for car trucks wherein the brakes associated with the wheels of each axle are operated by an independent brake cylinder.

These and other objects I attain by the construction shown in the accompanying drawings wherein, for the purpose of illustration, I have shown a preferred embodiment of my invention and wherein:

Fig. 1 is a semi-diagrammatic plan view embodying brake mechanism constructed in accordance with my invention;

Fig. 2 is a side elevation thereof; and

Fig. 3 is a central longitudinal sectional view showing the cylinder connections with the brake-operating mechanism.

Referring now more particularly to the drawings, the numerals 10 and 11 generally designate the front and rear axles of a car truck, the wheels 12 of these axles having clasp brakes 13 associated therewith. The brakes at corresponding sides of the wheels of each axle are connected by a transversely-extending beam 14, which beams are operated through a pair of levers 15 and 16. The lever 15 is pivoted to the car frame at 17 and pivotally connected to its associated beam at 18 above its lower end. The lower end of the lever 16 is link-connected to the lower end of the lever 15, as indicated at 19. Intermediate its ends, as at 20, this lever is pivotally connected to its associated beam and at its upper end the lever is connected to the rod 21 of a brake cylinder 22 or 23. The brake cylinder 22, which is associated with the braking mechanism at the forward axle 10, is of greater size than the braking cylinder 23 and it will thus be seen that with levers 15 and 16 associated with the axles 10 and 11 of identical lengths the braking forces applied to the wheels of these axles will be proportionate to the size of the cylinders. It will be obvious that it is, therefore, merely necessary to produce a single set of lever sizes for each truck, and by properly proportioning the lever sizes of the rear to those of the front truck the braking may be graduated substantially uniformly between the wheels of the axles from the front to the rear end of the car.

It will also be obvious that the braking mechanism as herein illustrated is capable of certain modifications without in any manner departing from the spirit of my invention and I, accordingly, do not wish to be understood as limiting myself thereto except as hereinafter claimed.

I claim:

1. In a car truck, a plurality of axles, independent braking mechanisms for the wheels of each axle, the braking mechanism of each axle comprising a braking cylinder, said braking cylinders being graduated in size from one end to the other of the truck.

2. In a car truck, a plurality of axles, independent braking mechanisms for each axle, each braking mechanism comprising operating levers, corresponding operating levers of the different braking mechanisms being of the same size, said braking mechanisms further each comprising a braking cylinder, the braking cylinders being graduated in size from one end to the other of the truck.

3. In a car truck, a pair of axles, a braking mechanism associated with each axle, said braking mechanisms including operating levers, corresponding operating levers of said braking mechanisms being of the same size and a cylinder associated with each braking mechanism to operate the same, one of said cylinders being of greater size than the other thereof.

4. In a car truck, a plurality of axles, independent clasp braking mechanisms for the wheels of each axle comprising a brake beam at each side of each axle, shoes at the end of each brake beam for co-action with a wheel of the axle, a vertically-extending lever pivoted intermediate its ends to each brake beam, the lower ends of said levers being link-connected, means supporting the upper end of one lever from the truck and a cylinder associated with the other lever and connected to the same adjacent the upper end thereof, said cylinders being graduated in size from one end of the truck to the other thereof, the operating levers of said braking mechanisms being of the same size.

ELMER LATSHAW.